(12) United States Patent
Saito et al.

(10) Patent No.: US 6,466,394 B1
(45) Date of Patent: Oct. 15, 2002

(54) STORAGE DEVICE AND METHOD OF DETECTING A POSITION OF A HEAD ON A DISK OF THE STORAGE DEVICE

(75) Inventors: Tomoaki Saito, Kanagawa (JP); Tatsuhiko Kosugi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/316,568

(22) Filed: May 21, 1999

(30) Foreign Application Priority Data

Nov. 30, 1998 (JP) .......................................... 10-340632

(51) Int. Cl.$^7$ ............................................... G11B 5/596
(52) U.S. Cl. ..................... 360/77.08; 360/67; 360/77.02
(58) Field of Search ........................... 360/77.01, 77.02, 360/77.05, 77.08, 78.01, 78.04, 78.14, 46, 51, 77.11, 48, 67, 68

(56) References Cited

U.S. PATENT DOCUMENTS 5,050,016 A    9/1991  Squires ..................... 360/77.08

FOREIGN PATENT DOCUMENTS

| JP | 07226041 | 8/1995 |
| JP | 10320939 | 12/1998 |

*Primary Examiner*—Regina N. Holder
*Assistant Examiner*—Mitchell Slavitt
(74) *Attorney, Agent, or Firm*—Greer, Burns & Crain, Ltd.

(57) ABSTRACT

The storage device comprises a magnetic disk having a servo region with a two lines of servo pattern for each track, a servo demodulator for detecting a position of a head on the disk according to the servo patterns as a detected position signal, a comparing section for outputting a difference between a target position signal and the detected position signal as a positional error signal, an amplifying section for amplifying the positional error signal with a gain G1 lower than a gain G0 at the time of data reading, and a controlling section for outputting a VCM operation rate signal according to an operation rate for a VCM for moving the magnetic head to the VCM according to the amplified positional error signal.

8 Claims, 16 Drawing Sheets

BLOCK DIAGRAM SHOWING ELECTRIC CONFIGURATION OF
THE STORAGE DEVICE 10 ACCORDING TO THE EMBODIMENT

BLOCK DIAGRAM SHOWING CONFIGURATION OF A FEEDBACK CIRCUIT IN THE STORAGE DEVICE 10 ACCORDING TO THE EMBODIMENT

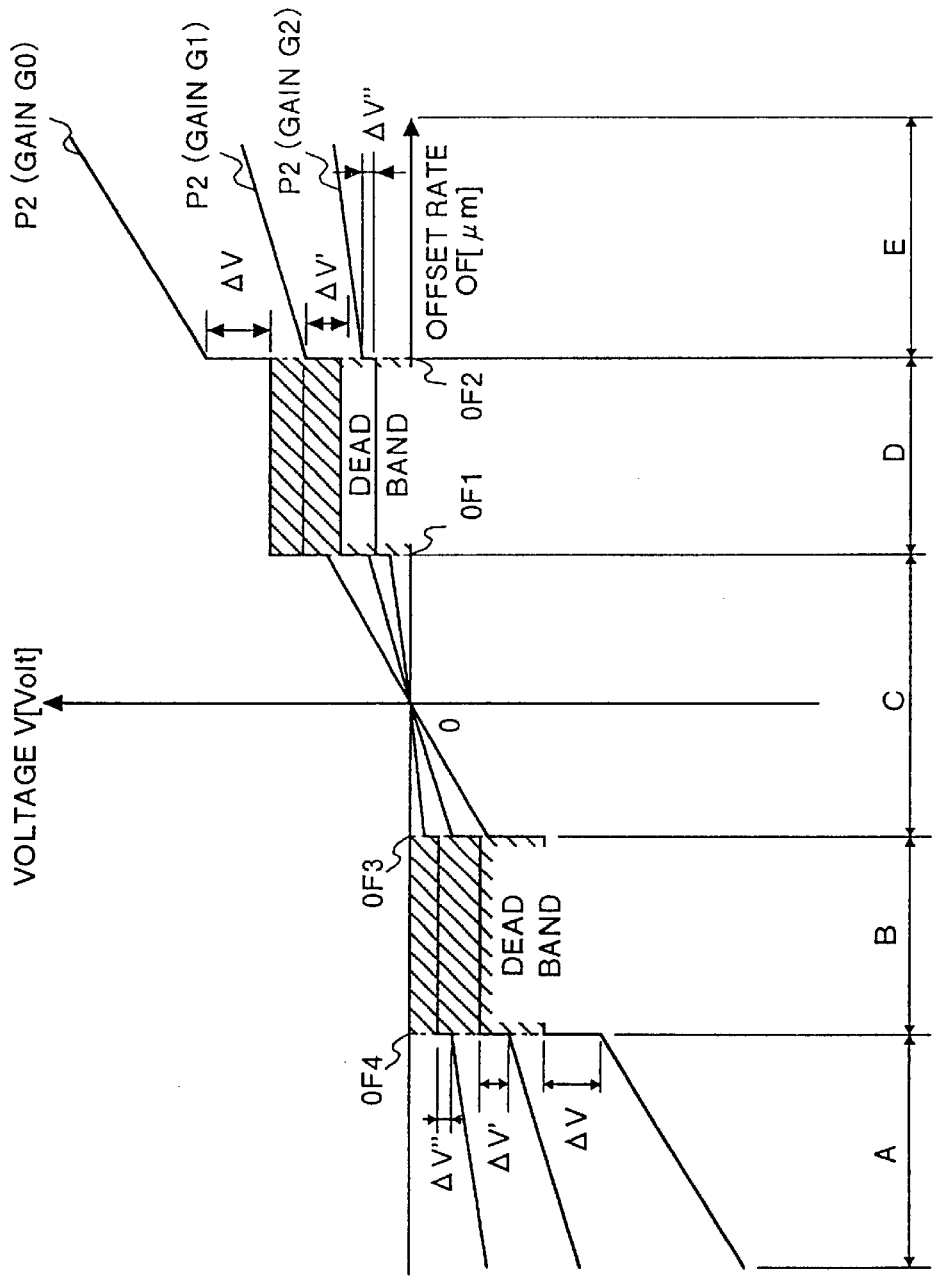

VIEW SHOWING A SERVO REGION RS ON A MAGNETIC DISK

VIEW FOR EXPLAINING AN OPERATION OF THE STORAGE DEVICE BASED ON THE CONVENTIONAL TECHNOLOGY

VIEW FOR EXPLAINING AN OPERATION OF THE STORAGE
DEVICE BASED ON THE CONVENTIONAL TECHNOLOGY

VIEW SHOWING A SERVO REGION RS ON A MAGNETIC DISK

VIEW FOR EXPLAINING A WRITE OPERATION ON A MAGNETIC DISK

VIEW FOR EXPLAINING A WRITE OPERATION ON A MAGNETIC DISK

VIEW FOR EXPLAINING A READ OPERATION ON A MAGNETIC DISK

VIEW FOR EXPLAINING A READ OPERATION ON A MAGNETIC DISK

VIEW SHOWING EACH POSITION OF MOVEMENT
OF A READ CORE R

VIEW FOR EXPLAINING THE PROBLEMS IN THE CONVENTIONAL TYPE OF STORAGE DEVICE

STORAGE DEVICE AND METHOD OF DETECTING A POSITION OF A HEAD ON A DISK OF THE STORAGE DEVICE

FIELD OF THE INVENTION

The present invention relates to a storage device used as an external storage device for a computer or the like as well as to a method of detecting a position of a head on a disk used for the same and more particularly, to a storage device for detecting a position of a magnetic head on a magnetic disk with a data region and a servo region provided thereon based on time division ("time division mode") as well as to a method of detecting a position of head on a disk used for the same.

BACKGROUND OF THE INVENTION

In recent years storage devices having great storage capacity are widely used. As a method of detecting a position of a magnetic head on a magnetic disk in such a storage device there is know a method of previously recording the servo patterns on the magnetic disk and detecting a position of the magnetic head thereon according to the servo patterns.

As an external storage device for a computer or the like, a storage device having a magnetic disk as a storage medium are widely used. A magnetic disk has a data region for storing therein data and a servo region for previously recording therein servo patterns for servo controls existing thereon in time division mode.

This type of storage device is substantially configured with the magnetic disk, a magnetic head closely located with respect to the magnetic disk, a servo controlling section for servo controlling so that the magnetic head positions at a target position by moving the magnetic head along the direction of radius of the disk at the time of read seek and write seek, and a read/write circuit for controlling a write and/or read operation of the magnetic disk using the magnetic head.

Herein, the magnetic head has a write core for writing data in a data region on the magnetic disk with a magnetic field generated by a current for recording fed from the read/write circuit, and a read core for magnetically detecting the data written in the data region and detecting a servo pattern recorded on the servo region.

The servo controlling section detects a position of the magnetic head on the magnetic disk according to a phase of the servo pattern detected by the read core of the magnetic head and then moves the magnetic head on the magnetic disk to a target position. More specifically, the servo controlling section servo-controls the magnetic head while receiving feedback of information for a detected position obtained from the servo pattern so that a positional error between the detected position and the target position becomes zero.

Next description is made for specific configuration of the storage device based on the conventional technology and the operations performed during detection of a position of the head on the disk with reference to FIG. 5A and FIG. 5B through FIG. 9. FIG. 5A and FIG. 5B are perspective views each showing configuration of the key section of the storage device based on the conventional technology. In FIG. 5A, the magnetic disks $111_1$ to $111_n$ are n-pieces of disk-shaped recording medium for magnetically storing data therein, and are located at prespecified intervals in the axial direction in a multi-layered form. These magnetic disks $111_1$ to $111_n$ are rotated and driven with high speed by a spindle motor not shown in the figure. Further, each of the magnetic disks $111_1$ to $111_n$ has a data region for storing the data therein and a servo region for recording servo patterns therein respectively.

In each of the magnetic disks $111_1$ to $111_n$, each region obtained by dividing a space between the most inner region and the most outer region thereof into concentric circles with a prespecified width therebetween (track pitch) is called a track TK. When the tracks TK on the magnetic disks $111_1$ to $111_n$ are extracted three-dimensionally, these tracks TK are arranged cylindrically. A set of plurality of tracks TK existing at the same distance in the radial direction from the center on the surfaces of each of the magnetic disks $111_1$ to $111_n$ are called cylinders C1 to Cn (Refer to FIG. 5B).

FIG. 6 is a view showing servo regions RS on each of the magnetic disks $111_1$ to $111_n$. In the figure, the same reference numerals are assigned to the sections corresponding to those in FIG. 5A and FIG. 5B, and description thereof is omitted herein. It should be noted that FIG. 6 shows an example of servo regions RS each provided as a linear shape and also shows the cylinders C0 to C3 of the cylinders C0 to Cn to facilitate the understanding thereof.

In FIG. 6, four cylinders C0 to C3 are set as one group. Those cylinders C0 to C3 (or the tracks TK) are located adjacent to each other with boundries K, K, ... at a track pitch TP. Herein the track pitch is 2 μm. A total of three lines of servo patterns S3, S3, ... with a phase difference of 90 degree from each other are recorded in time division mode on each of the cylinders C0 to C3.

Namely, taking the cylinder C0 as an example, three lines of servo patterns S3, S3, ... are recorded on this cylinder C1 at a prespecified interval therebetween so as to divide one track pitch TP into m (m=3 in the example of the figure) divisions. These patterns S3, S3, ... are magnetic patterns used for positions of the magnetic heads $113_1$ to $113_n$ on the magnetic disks $111_1$ to $111_n$. Herein a servo pattern length L3 of the servo pattern S3 is set to ⅓ of the track pitch TP.

Returning back to FIG. 5A, the magnetic heads $113_1$ to $113_n$ each have a read core and a write core having an extremely narrow gap, and are located adjacent to the magnetic disks $111_1$ to $111_n$ respectively. Each of the magnetic heads $113_1$ to $113_n$ has a write core W (Refer to FIG. 7) for writing data in each of the magnetic disks $111_1$ to $111_n$ with a magnetic field generated by a recording current fed when writing, and a read core R (Refer to FIG. 7) for magnetically detecting the data and the servo patterns S3 (Refer to FIG. 6) recorded on each of the magnetic disks $111_1 1$ to $111_1$. A number n of the magnetic heads $113_1$ to $113_n$ is decided according to a number n of the magnetic disks $111_1$ to $111_n$.

Herein, on the magnetic head 1131 shown in FIG. 7, a center line Xb linking the read core R to the write core W and a tangent line Xa of the cylinder C1 where the read core R positions make an angle θ of yaw. A width WR of the read core R is around ½ of the track pitch TP because of designing restriction, and is more specifically 0.7 μm to 1.3 μm. Also, since there is the angle θ of yaw as described above, an effective read-core width WR' with respect to the cylinder C1 becomes WR·cosθ.

Operations for detecting a position of a head on a disk in the storage device based on the conventional technology will be described in the following. In FIG. 5A, when a spindle motor not shown herein is driven, the magnetic heads $113_1$ to $113_n$ are concurrently rotated and driven. Description centering on an operation of the magnetic head $113_1$ will be made hereinafter to simplify the description.

Assuming herein that the magnetic head $113_1$ shown in FIG. 7 positions outside the cylinder C0 and that the magnetic head $113_1$ is moved from the current position to a central position of the cylinder C1 shown in the same figure, the servo controlling section (not shown herein) moves the magnetic head $113_1$ at a ⅓-track pitch in the radius direction of the disk.

With this operation, the magnetic head $113_1$ is first moved so as to traverse the cylinder C0. During this movement, the servo patterns S3, S3, . . . are detected by the read core R, and the servo controlling section generates a positional error signal from the difference between a detected position signal according to a phase difference of each servo patterns S3 and a target position signal according to a target position of the magnetic head $113_1$.

The servo controlling section amplifies the positional error signal with a gain G0 (Refer to FIG. 9) and generates an amplified positional error signal P0. Herein, FIG. 9 is a view showing a relation between an offset rate OF of the magnetic head $113_1$ and a voltage V (level) of the amplified positional error signal P0. As understood from this figure, the amplified positional error signal P0 changes linearly so as to be in proportion to the offset rate OF.

Then the magnetic head $113_1$ shown in FIG. 7 positions at the center (track center) of the cylinder C1 as a target position, a read/write circuit feeds a recording current according to write data to the write core W of the magnetic head $113_1$. Thus, write data is written in the data region (not shown herein) by the write core W. Although description in the conventional type of storage device has been made for the servo patterns S3, S3, . . . obtained by dividing the track pitch TP into three lines in each servo region RS of the cylinders C0 to C2 shown in FIG. 7, there is also an example of recording servo patterns S4, S4, . . . obtained by dividing the track pitch TP into four lines as shown in FIG. 8 on the track TK.

In the example shown in FIG. 8, taking the cylinder C0 . . . (track TK) as an example, four lines of servo patterns S4, S4, . . . are recorded on this cylinder C0 at a prespecified interval therebetween so as to divide one track pitch TP into m (m=4 in the example of the same figure). A length L4 of this servo pattern S4 is set to ¼ of the track pitch TP, so that this length is shorter than the servo pattern length L3 shown in FIG. 7. Accordingly, in the example shown in FIG. 8, the magnetic head $113_1$ is moved at a ¼ track pitch TP in the radius direction of the disk.

In the conventional type of storage device as described with reference to FIG. 7 and FIG. 8, the description has been made for detection of a position of the magnetic head $113_1$ by using the servo patterns S3 or servo patterns S4 with the servo pattern length L3 or servo pattern length L4 as the ⅓ track pitch TP or ¼ track pitch TP for each track TK respectively.

Herein, in the conventional type of storage device, when the servo pattern S3 with the ⅓ track pitch TP is used the magnetic head $113_1$ is successively fed at the ⅓ track pitch TP, and when the servo pattern S4 with the ¼ track pitch TP is used the magnetic head $113_1$ is successively fed at the ¼ track pitch TP.

It is understood from the fact described above in the conventional type of storage device that, when a length of a servo pattern is shorter, the magnetic head $113_1$ is moved in smaller steps which increases a time for STW (servo track writing) . Therefore, there has been a request for reducing the time for STW by making the length of the servo pattern as long as possible. This type of request is, especially in the manufacturing field of the storage device, related to reduction of facilities or the like by reducing the time for STW.

Therefore, in the conventional type of storage device, the request can be responded to by a method of using servo patterns S2, S2 each having a servo pattern length L2 of ½ of the track pitch TP for each track TK as shown in FIG. 10. Namely, when the method described above is used, as the servo pattern length L2 of this servo pattern S2 corresponds to a length of ³⁄₂ of the servo pattern length L3 of the servo pattern S3, the time for STW per track pitch TP is reduced to ⅔ as compared to that of the servo pattern S3.

When the method is used, however, there comes up another problem, although the method has the advantage described above, that large vibrations occur in a magnetic head $113_1$ when the magnetic head $113_1$ positions at a dead band described later during data reading, which does not allow the request to be responded to. This is caused by the fact that an angle of yaw made with a center line Xb linking a read core R to a write core W and a tangent line Xa of the cylinder C1 on the magnetic head $113_1$ is set to θ as shown in FIG. 11. Namely, as for the write operation, the write core W always positions at a track center TC' of the cylinder C1 in the data region RD in data writing shown in the figure, so that a normal write operation is insured.

In contrast, when the read operation is performed, the read core R has to be moved to the side of the cylinder C2 by a correction rate H (Refer to FIG. 11) for displacement of the core as shown in FIG. 13 in order to be positioned at the track center TC' of the data region RD. During this movement, there comes up a dead band where the read core R can detect only one line of servo pattern S2. More specifically, when the read core R is present at a position B and a position D shown in FIG. 15, the read core R is positioned at the dead bands.

FIG. 16 shows changes of the amplified positional error signal P0 as described above when the read core R is positioned at this dead band. As understood from this figure, when the read core R is positioned at the position B and position D, a voltage V steeply rises in the offset rate OF1 to offset rate OF4 by a voltage displacement rate ΔV. Accordingly, as this voltage displacement rate ΔV corresponds to a movement rate of the magnetic head $113_1$, when the read core R positions at the dead band, the movement rate of the magnetic head $113_1$ increases, which results in occurrence of vibrations, and in a worst case, the magnetic head $113_1$ may run away out of control. The influence due to this dead band becomes more significant when the angle θ of yaw shown in FIG. 12 is larger.

SUMMARY OF THE INVENTION

It is an object of the present invention to provide, for the purpose of solving the problems as described above, a storage device which can prevent vibrations of a head or the like even when there are a small number of servo patterns for one track on a disk or even when a servo pattern head positions at a dead band and also can reduce a time for STW and a method of detecting a position of the head on a disk used in the storage device.

The storage device according to the present invention comprises a disk having a servo region with a plurality of tracks formed thereon at a prespecified track pitch as well as with m-lines of servo pattern each having a servo pattern length of a 1/m-track pitch for each track formed in time division mode, and a data region for storing therein data. The storage device also comprises a position detecting unit for detecting a position of a head on the disk according to the servo patterns and outputting a result of detection as a detected position signal, and a positional error computing unit for obtaining a positional error between the position detected signal fed-back by the position detecting unit and a positional error signal indicating a target position of the head and outputting a result of computation as a positional error signal. The storage device further comprises an amplifier for amplifying the positional error signal with a prespecified gain and outputting a result of amplification as an amplified positional error signal, and a gain setting unit for setting a gain of the amplifier at the time of data reading to a lower value as compared to a gain at the time of data writing. The storage device also comprises a head moving unit for obtaining an operation rate corresponding to a movement rate of the head according to the amplified positional error signal and moving the head according to this operation rate.

Thus, in the storage device described above, the gain setting unit sets the gain of the amplifier at the time of data reading to a value which is lower as compared to a gain at the time of data writing. When a positional error signal and a position detected signal are inputted into the positional error computing unit it calculates a positional error between the position detected signal and positional error signal and outputs a result of calculation as a positional error signal to the amplifier. The positional error signal is amplified with a gain which is lower than the gain at the time of data writing and is supplied to the head moving unit as an amplified positional error signal. The head moving unit obtains an operation rate corresponding to a movement rate of the head according to this amplified positional error signal and moves the head according to this operation rate.

During this movement of the head, even when the level of the detected position signal steeply rises because the head is located at a dead band where the position detecting unit cannot accurately detect a position of the head, as the gain of the amplifier is set to a lower value, the amplified positional error signal is not directly affected by the steep rise of the level thereof.

Accordingly, with the storage device of the present invention, even when the head is positioned at a dead band the operation rate does not increase, so that vibrations of the head can be prevented and also a number of lines of servo pattern for each track can be reduced, which allows a time for STW in the manufacturing field to be reduced and facilities also to be reduced.

In the present invention, the disk has two lines of servo pattern each having a servo pattern length of a ½ track pitch for each track formed thereon in time division mode.

With the storage device of the present invention, two lines of servo patterns each having a servo pattern length of ½ of the track pitch for each track are formed on a disk in time division mode, so that the time for STW can be reduced by ⅔ as compared to that in the case where a number of lines of conventional servo pattern is three lines.

In the present invention, the gain setting unit sets a gain of the amplifier at the time of data reading to a value which is ½ as compared to a gain at the time of data writing.

With the storage device of the present invention, gain of the amplifier at the time of data reading is set to ½ of the gain at the time of data writing by the gain setting unit, so that vibrations generated when the head is positioned at a dead band can be reduced to half as compared to those of the conventional type.

A method of detecting a position of the head on a disk used for the storage device according to the present invention comprises a position detecting step of detecting a position of a head on the disk according to the servo patterns and outputting a result of detection as a detected position signal, and a positional error computing step of obtaining a positional error between the position detected signal fed-back in the position detecting step and a positional error signal indicating a target position for the head and outputting a result of computation as a positional error signal. The method also comprises an amplifying step of amplifying the positional error signal with a prespecified gain and outputting a result of amplification as an amplified positional error signal, and a gain setting step of setting a gain in the amplifying step at the time of data reading to a lower value as compared to a gain at the time of data writing. The method further comprises a head moving step of obtaining an operation rate corresponding to a movement rate of the head according to the amplified positional error signal and moving the head according to this operation rate.

Thus, in the method of the present invention, a gain in the amplifying step at the time of data reading is set to a lower value as compared to a gain at the time of data writing in the gain setting step. In the positional error computing step, a positional error between a position detected signal and a positional error signal are obtained and a result of computation is outputted as a positional error signal. This positional error signal is amplified with a gain lower than that at the time of data writing. Then in the head moving step, an operation rate corresponding to a movement rate of the head is obtained according to the amplified positional error signal and the head is moved according to this operation rate.

During this movement of the head, even when the level of the detected position signal steeply rises because the head is positioned at a dead band where a position of the head can not accurately be detected in the position detecting step, as the gain in the amplifying step is set to a lower value, the amplified positional error signal is not directly affected by the steep rise of the level thereof.

Accordingly, with the method of the present invention, even when the head is positioned at a dead band the operation rate does not increase, so that vibrations of the head can be prevented and also a number of lines of servo pattern for each track can be reduced, which allows a time for STW in the manufacturing field to be reduced by this reduction rate, so that facilities can also be reduced.

In the method of detecting a position of the head on the disk used for the invention described above, the disk has two lines of servo patterns each having a servo pattern length of ½ of the track pitch for each track formed thereon in time division mode.

With the method of the present invention, in the gain setting step, a gain in the amplifying step at the time of data reading is set to a value which is ½ of the gain at the time of data writing, so that vibrations generated when the head is positioned at a dead band can be reduced to half as compared to those of the conventional type.

In the method of detecting a position of the head on the disk used for the invention described above, in the gain setting step, a gain in the amplifying step at the time of data reading is set to a value which is ½ of the gain at the time of data writing.

With the method of the present invention, in the gain setting step, a gain in the amplifying step at the time of data reading is set to a value which is ½ of the gain at the time of data writing, so that vibrations generated when the head is positioned at a dead band can be reduced to half as compared to those of the conventional type.

Other objects and features of this invention will become understood from the following description with reference to the accompanying drawings.

BRIEF DESCRIPTION OF THE DRAWINGS

FIG. 4 is a characteristic view showing a relation between an offset rate and a voltage;

DESCRIPTION OF THE PREFERRED EMBODIMENTS

Detailed description is made hereinafter for one embodiment of the storage device and method of detecting a position of the head on the disk used for the same according to the present invention with reference to the related drawings.

Figure 1:
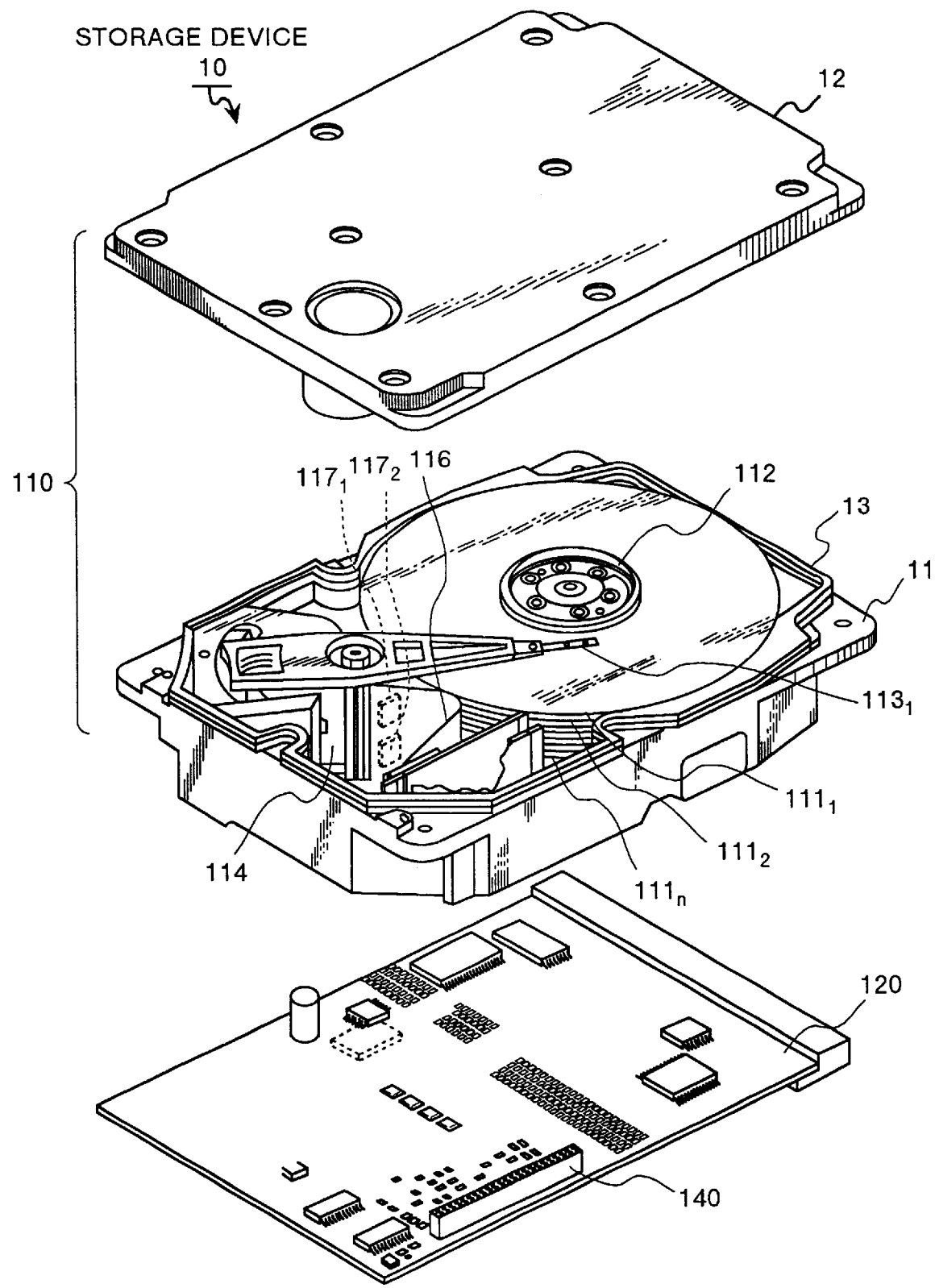
FIG. 1 is an exploded perspective view showing appearance of a storage device according to one embodiment of the present invention.
Figure 2:
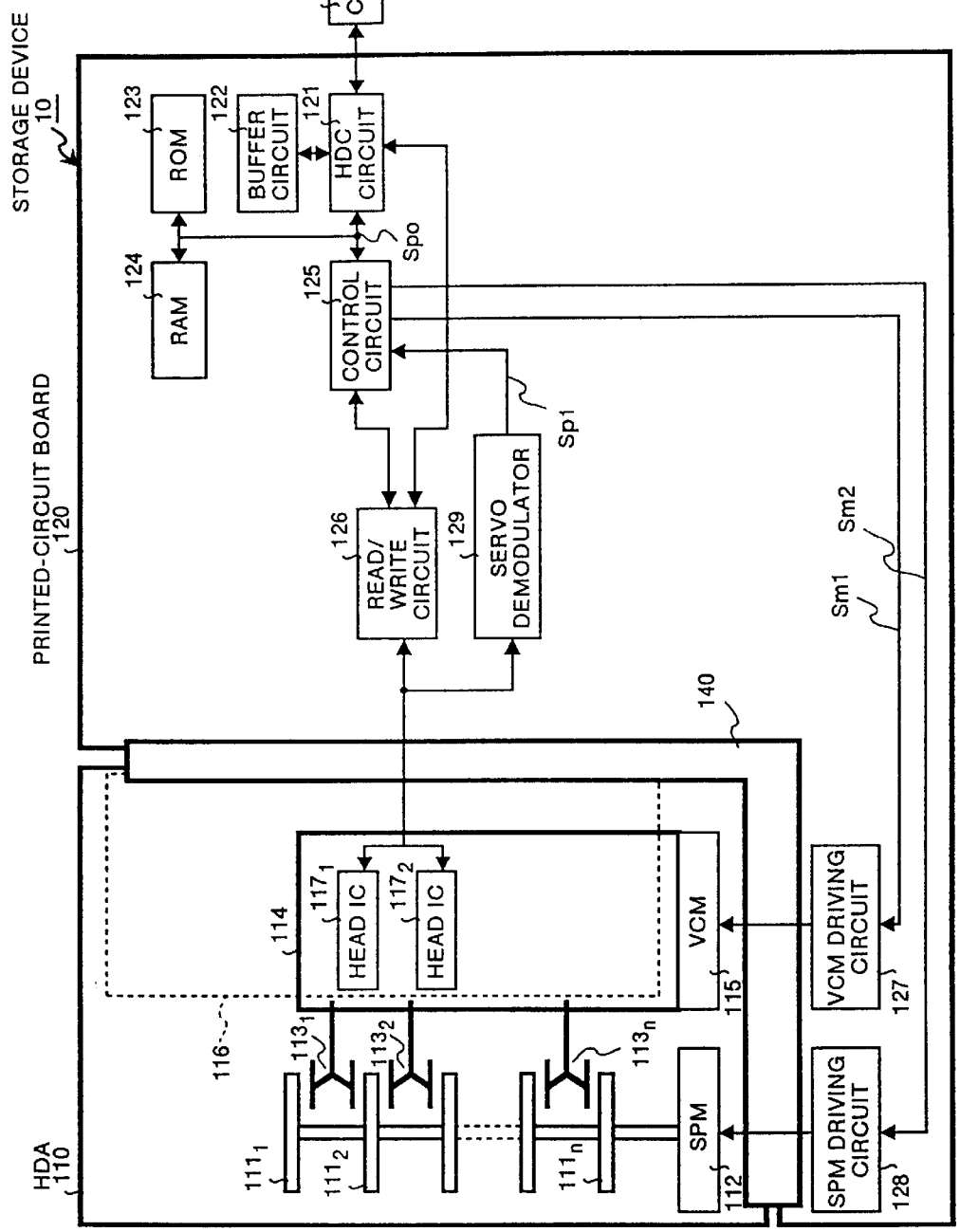
FIG. 2 is a block diagram showing electric configuration of the storage device according to the embodiment.

FIG. 1 is an exploded perspective view showing appearance of a storage device 10 according to one embodiment of the present invention, and FIG. 2 is a block diagram showing electric configuration of the storage device 10 according to the embodiment. In FIG. 1 and FIG. 2, the same reference numerals are assigned to the sections corresponding to those in Fig. SA.

In FIG. 1, the storage device 10 comprises a HDA (head disk assembly not shown herein) with a magnetic disk $111_1$ and a magnetic head $113_1$ or the like encapsulated in a gastight enclosure comprising a frame 11 and a cover 12; a HDC (hard disk controller) circuit 121, a printed-circuit board 120 with various types of circuit mounted thereon, and a connector 140 for electrically connecting the components in the HDA 110 to the printed-circuit board 120.

The HDA 110 is configured by assembly of the substantial box-shaped frame 11 with the top surface thereof open, a plurality of magnetic disks $111_1$ to $111_n$ accommodated in the frame 11, a SPM (spindle motor) 112, magnetic heads $113_1$ to $113_n$, a carriage 114, a FPC (flexible printed circuit sheet) 116, and the cover 12 sealing the top-surface opening section of the frame 11 through a packing 13.

Figure 10:
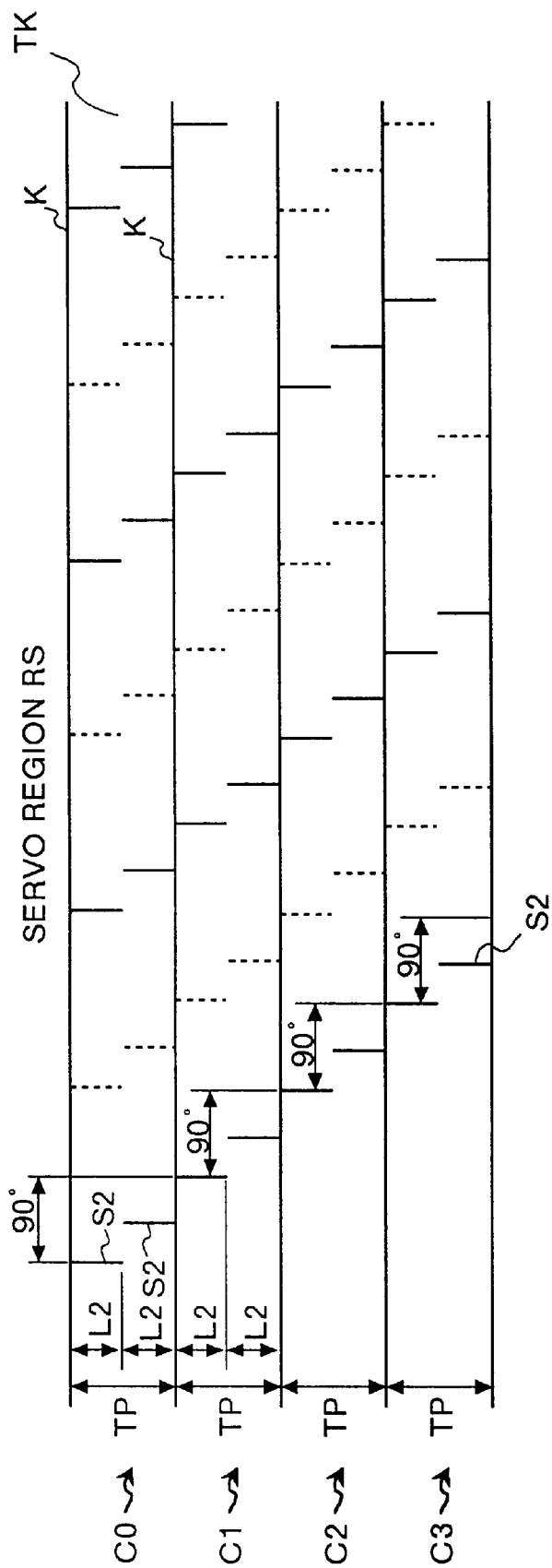
FIG. 10 is a view showing a servo region RS on a magnetic disk.
Figure 11:
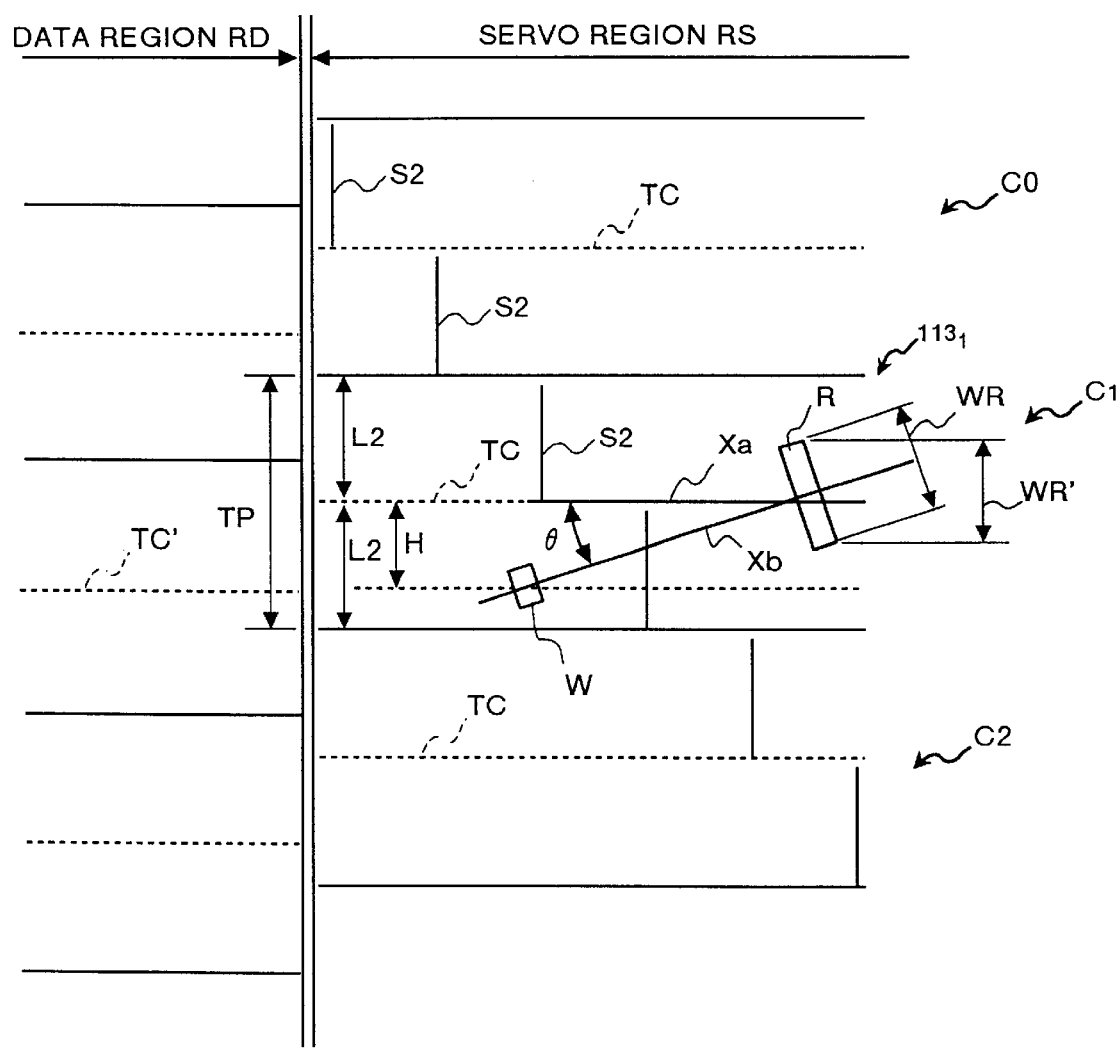
FIG. 11 is a view for explaining a write operation on a magnetic disk.

In the HDA 110, the magnetic disks $111_1$ to $111_n$ are n-pieces of disk-shaped storage mediums each for magnetically storing data therein, and are arranged at prespecified intervals therebetween in the axial direction so as to be multilayered. Each of those magnetic disks $111_1$ to $111_n$ has a servo region RS and a data region RD as shown in FIG. 10 and FIG. 11, and servo patterns S2, S2, obtained by dividing each of cylinders C0 to C3 (track TK) into two are recorded in the servo region RS. The carriage 114 provided adjacent to the magnetic disks $111_1$ to $111_n$ supports the magnetic heads $113_1$ to $113_n$. The FPC 116 is a sheet-like and flexible wiring material and connects the terminals (not shown herein) of the carriage 114 and connector 140.

Various types of circuit such as the HDC circuit 121 and a buffer circuit 122 shown in FIG. 2 are mounted on the printed-circuit board 120 shown in FIG. 1, and these circuits are electrically connected to the components (such as a head IC $117_1$ and a head IC $117_2$) in the HDA 110 through the connector 140.

Description is made for electric configuration of the storage device 10 according to one embodiment of the present invention with reference to FIG. 2. In FIG. 2, the same reference numerals are assigned to the sections corresponding to those in FIG. 1, and description thereof is omitted herein.

In the HDA 110 shown in FIG. 2, the SPM 112 rotates the magnetic disks $111_1$ to $111_n$ at a high speed. Each of the head IC (integrated circuit) $117_1$ and the head IC $117_2$ comprises a write amplifier and a preamplifier (both are not shown herein) and is mounted in parallel on the surface of the FPC 116 respectively. The write amplifier switches the polarity of a record current to be supplied to the magnetic heads $113_1$ to $113_n$ according to write data supplied from a CPU 150, while the pre-amplifier amplifies reproduction voltages (read signals) detected by the magnetic heads $113_1$ to $113_n$.

It should be noted that, when a number of heads in the magnetic heads $113_1$ to $113_n$ is less than a prespecified number, it is also possible to control the magnetic heads $113_1$ to $113_n$ by only one head IC $117_1$ 1without requiring the head IC $117_2$ to be provided therein.

A VCM (voice coil motor) 115 moves the magnetic heads $113_1$ to $113_n$ in the radius direction of the magnetic disks $111_1$ to $111_n$ by rotating the carriage 114.

The printed-circuit board 120 is an external board detachably attached to the rear surface of the HDA 110 through the connector 140, and the connector 140 works as an interface between the components in the HDA 110 and the various types of circuit mounted on the printed-circuit board 120. The HDC circuit 121 on the printed-circuit board 120 is connected to the CPU 150 through a SCSI (Small Computer System Interface) bus not shown herein, and performs data transaction or the like such as various instructions, write data (write-in data) to be written in the magnetic disks $111_1$ to $111_n$, and read data read-out from the magnetic disks $111_1$ to $111_n$ with the CPU 150 through the SCSI bus.

The HDC circuit 121 also generates the target-position signals Sp0 indicating the target positions of the magnetic heads $113_1$ to $113_n$ on the magnetic disks $111_1$ to $111_n$ and a control signal for controlling formats for storage and reproduction on the magnetic disks $111_1$ to $111_n$ or the like.

The buffer circuit 122 is a DRAM (Dynamic Random Access Memory) with, for instance, 512-KB storage capacity, and temporarily stores therein write data inputted from the CPU 150 and read data read-out from the magnetic disks $111_1$ to $111_n$.

A ROM (Read Only Memory) 123 stores therein a program for providing controls over writing/reading executed by the HDC circuit 121, and is accessed by the HDC circuit 121 when this program is to be executed. A RAM (Random Access Memory) 124 temporarily stores therein various data produced during execution of the program.

A control circuit 125 servo controls the positions of the magnetic head $113_1$ to $113_n$ according to the target-position signals Sp0 inputted from the HDC circuit 121 as well as according to the detected position signals Sp1 inputted from a servo demodulator 129 described later and also controls each section of the device at the time of data reading and writing. Details of the operation of this control circuit 125 are described later.

A read/write circuit 126 comprises a modulator for writing write data in the magnetic disks $111_1$ to $111_n$, a parallel/serial converter for converting parallel write data to serial data, and a demodulator for reading read data from the magnetic disks $111_1$ to $111_n$. The read/write circuit 126 also comprises a serial/parallel converter for converting serial read data to parallel data, and a synthesizer circuit for generating timing signals for timing of each section of the device by multiplying a frequency from an oscillating circuit using a quartz oscillator.

The servo demodulator 129 detects the positions of the magnetic heads $113_1$ to $113_n$ on the magnetic disks $111_1$ to $111_n$ according to a phase difference between the servo patterns S2 and S2 recorded in the servo region RS on the magnetic disks $111_1$ to $111_n$ (see FIG. 10). The servo demodulator 129 outputs a result of the detected positions to the control circuit 125 as detected position signals Sp1.

A VCM driving circuit 127 drives the VCM 115, and has a power amplifier (not shown in the figure) for feeding a drive current according to a VCM operation rate signal Sm1 fed by the control circuit 125 to the VCM 115 through the connector 140.

A SPM driving circuit 128 drives the SPM 112, and has a power amplifier (not shown in the figure) for feeding a drive current according to a SPM operation rate signal Sm2 fed by the control circuit 125 to the SPM 112 through the connector 140.

Thus, the control circuit 125 provides controls for the magnetic heads $113_1$ to $113_n$ to be positioned by controlling the drive current to the VCM driving circuit 127 and the SPM driving circuit 128 in such a way that a detected position obtained from the detected position signal Sp1 will be the same as the target position obtained from the target position signal Sp0 while receiving feedback of the detected position signal Sp1 demodulated by the servo demodulator 129.

Figure 3:
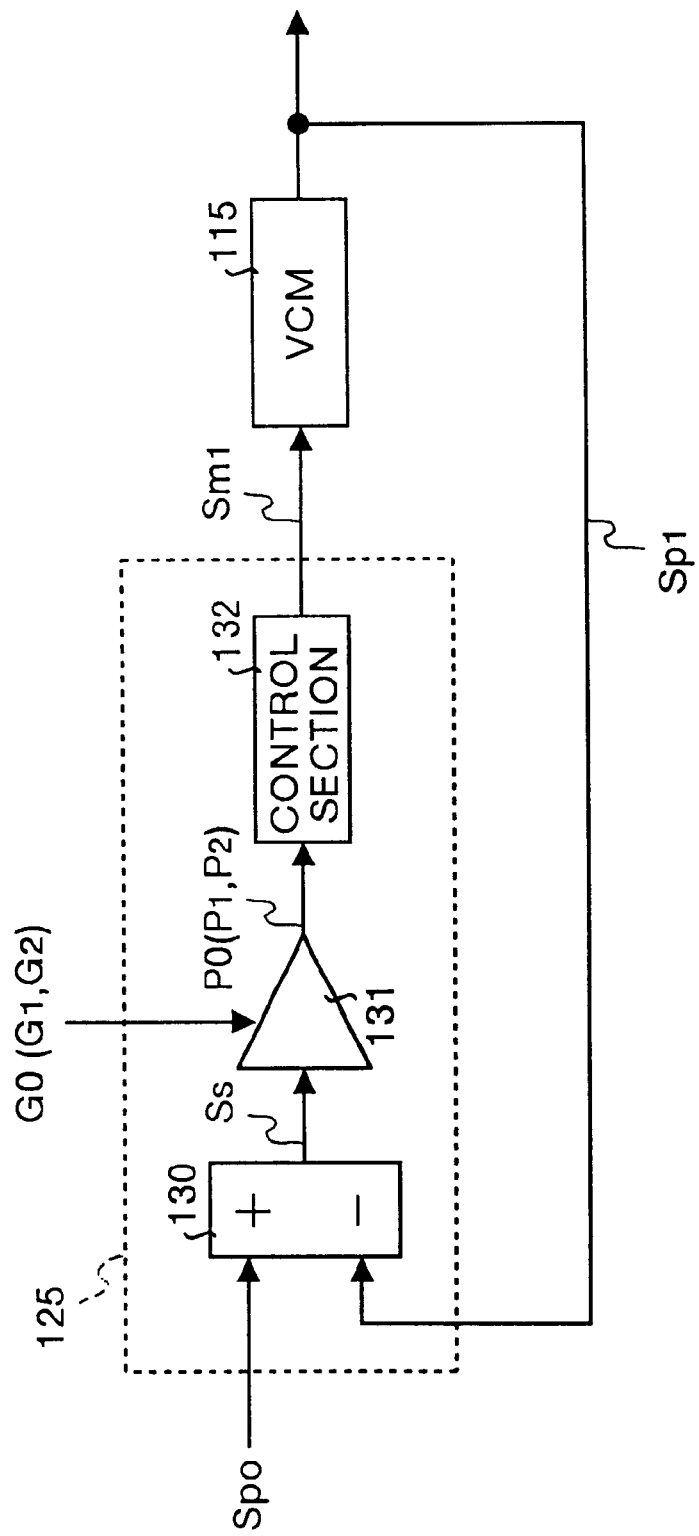
FIG. 3 is a block diagram showing configuration of a feedback circuit in the storage device according to the embodiment.
Figure 5A:
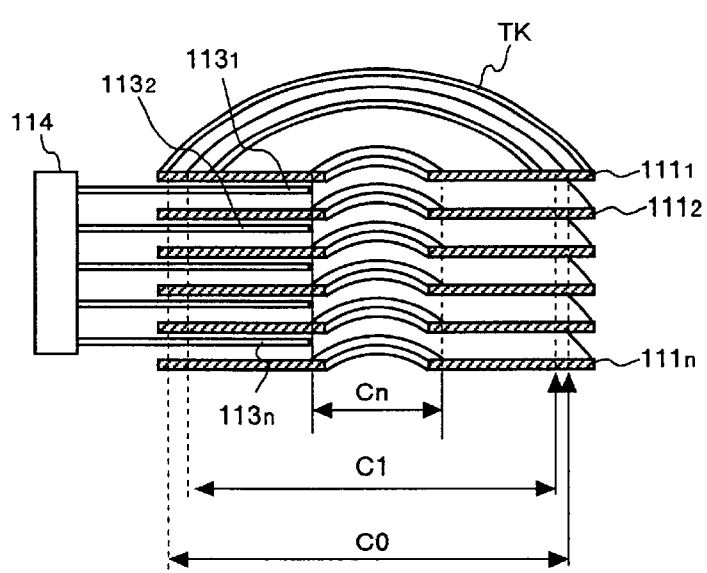
FIG. 5A and FIG. 5B are perspective views showing configuration of the key section of the storage device based on the conventional technology.
Figure 5B:
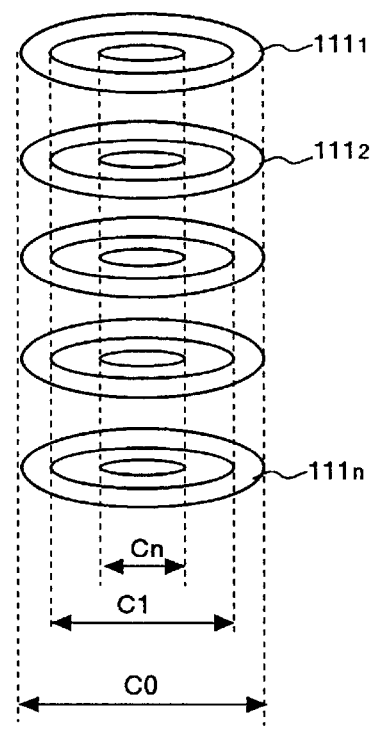
Figure 6:
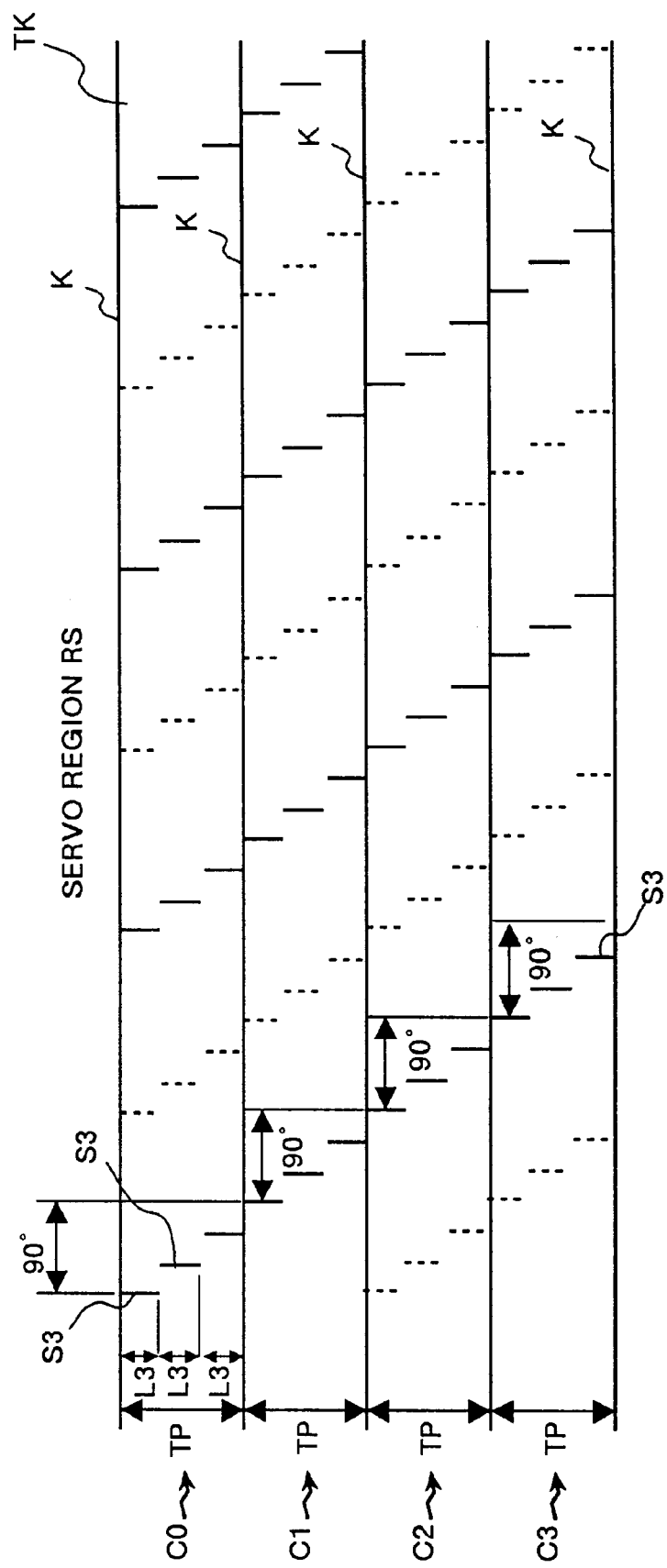
FIG. 6 is a view showing a servo region RS on a magnetic disk.
Figure 7:
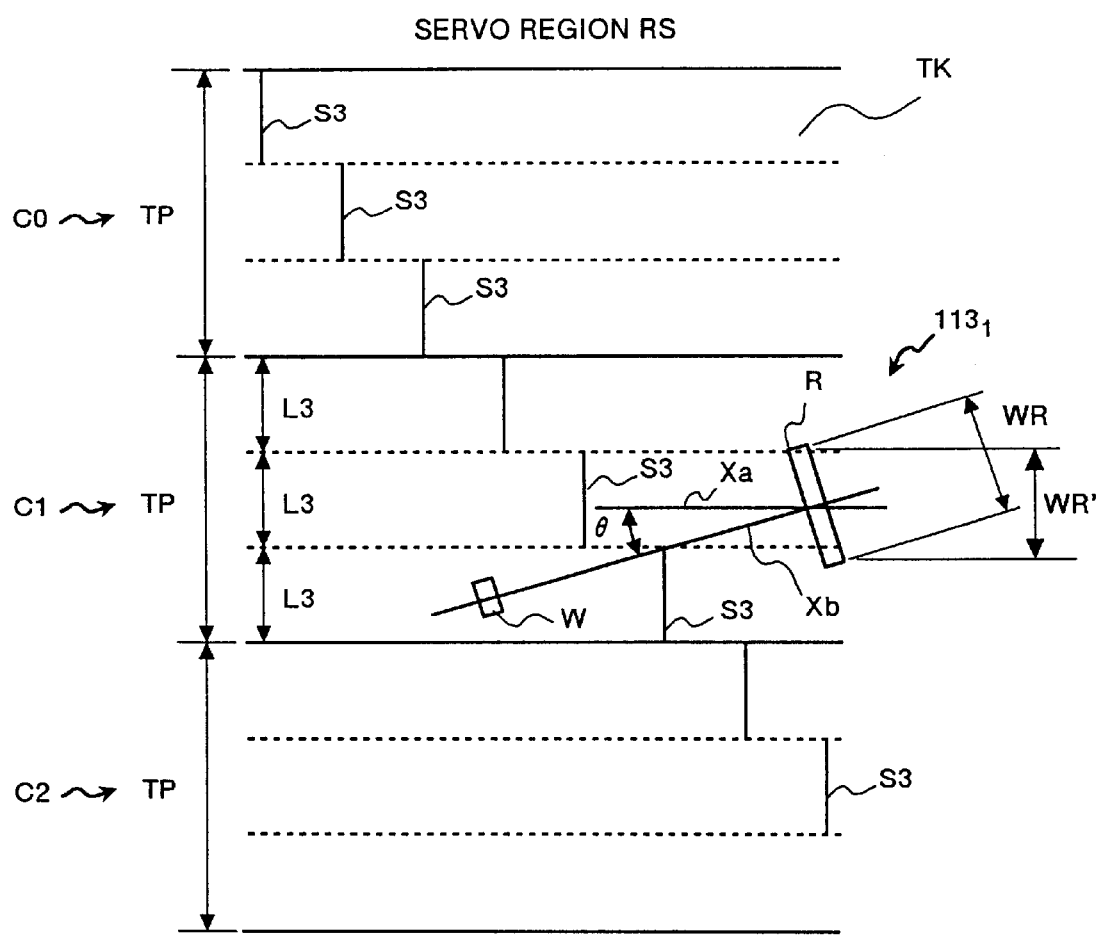
FIG. 7 is a view for explaining an operation of the storage device based on the conventional technology.
Figure 8:
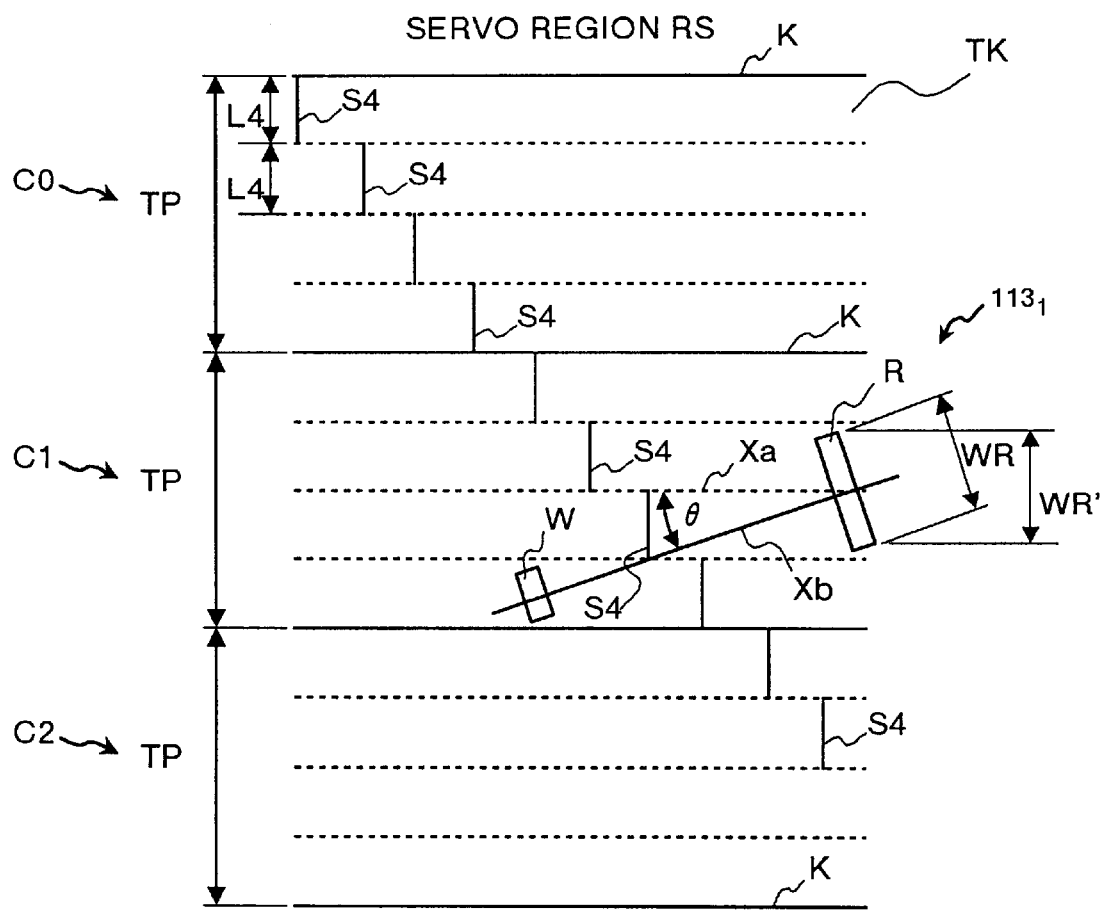
FIG. 8 is a view for explaining an operation of the storage device based on the conventional technology.
Figure 9:
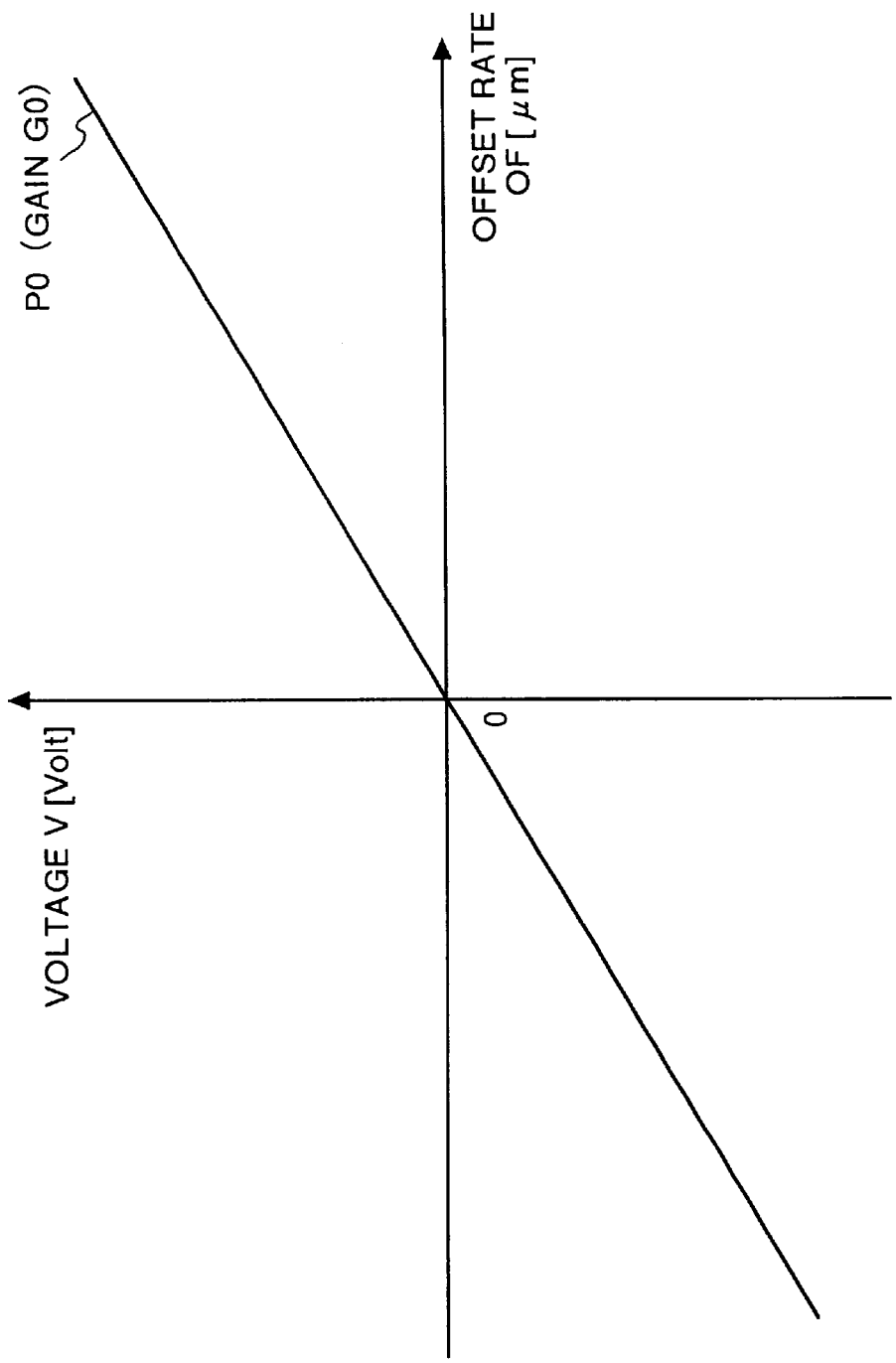
FIG. 9 is a characteristic view showing a relation between an offset rate and a voltage.

FIG. 3 is a block diagram showing configuration of a feedback circuit formed when controls are provided for positioning the magnetic heads $113_1$ to $113_n$, and the same reference numerals are assigned to the sections corresponding to those in FIG. 2.

In the control circuit 125 shown in FIG. 3, a comparing section 130 compares a target position signal Sp0 inputted from the HDC circuit 121 (Refer to FIG. 2) with a detected position signal Sp1 inputted from the servo demodulator 129 (Refer to FIG. 2). The comparing section 130 calculates a difference between the target position signal Sp0 and detected position signal Sp1, and outputs this difference as a positional error signal Ss.

An amplifying section 131 amplifies the positional error signal Ss with a prespecified gain. Herein, the gain of the amplifying section 131 is set to a value of G0 when the data is written in the magnetic disks $111_1$ to $111_n$, and is set to a value of G1 or a gain G2 (<G1) when data is read from the magnetic disks $111_1$ to $111_n$. Both the gain G1 and gain G2 are set to values lower than the gain G0. It is assumed as an example that the gain G2 is set to a value of about ½ (6dB) of that of the gain G0. Namely, the amplifying section 131 amplifies, when the gain G0 is set at the time of writing as a gain, the positional error signal Ss with the gain G0 and outputs the amplified gain as an amplified positional error signal P0.

On the other hand, when the gain G1 or gain G2 is set as a gain at the time of reading, the amplifying section 131 amplifies the positional error signal Ss with the gain G1 or gain G2 and outputs a result of amplification as an amplified positional error signal P1 or P2 respectively.

The control section 132 calculates an operation rate for the VCM 115 so that the amplified positional error signal P0 (the amplified positional error signal P1 or amplified positional error signal P2) becomes zero, and outputs a VCM operation rate signal Sm1 according to this operation rate to the VCM 115. Herein, the VCM 115 is an object to be controlled in a feedback control system. FIG. 2 shows a configuration in which a VCM operation-rate signal Sm1 is inputted into the VCM driving circuit 127, however FIG. 3 shows a configuration in which, for the sake of convenience, a VCM operation rate signal Sm1 is inputted into the VCM 115 from the point of view that the VCM is an object to directly be controlled.

Operations of the storage device 10 according. to one embodiment of the present invention will be described in the following. At first, the write operation will be described with reference to FIG. 11 and FIG. 12. In FIG. 2, when a SPM operation rate signal Sm2 is fed from the control circuit 125 to the SPM driving circuit 128, a drive current according to the SPM operation rate signal Sm2 is outputted to the SPM 112 through the connector 140. With this operation, the SPM 112 is rotated and driven at a specified rotational speed, with which the magnetic disks $111_1$ to $111_n$ are rotated and driven respectively. It should be noted that description centering on an operation of the magnetic head $113_1$ will be made below to simplify the description.

Assuming herein that the magnetic head $113_1$ shown in FIG. 11 is positioned outside the cylinder C0 and that the magnetic head $113_1$ is moved from the current position to a central position of the cylinder C1 shown in the same figure, the HDC circuit 121 decides the central position of the cylinder C1 as a target position and outputs a target position signal Sp0 to the comparing section 130 shown in FIG. 3 of the control circuit 125. The HDC circuit 121 sets a gain of the amplifying section 131 shown in FIG. 3 to the gain G0 for writing.

In this case, assuming that the detected position signal Sp1 is equal to zero (Sp1=0), the comparing section 130 outputs a positional error signal Ss (=a target position signal Sp0) to the amplifying section 131. The amplifying section 131 amplifies the positional error signal Ss with the gain G0 and outputs the amplified signal as an amplified positional error signal P0. The control section 132 obtains an operation rate for the VCM 115 so that the amplified positional error signal P0 becomes zero, and outputs a VCM operation rate signal Sm1 according to this operation rate to the VCM 115 (VCM driving circuit 127 in FIG. 2).

Figure 12:
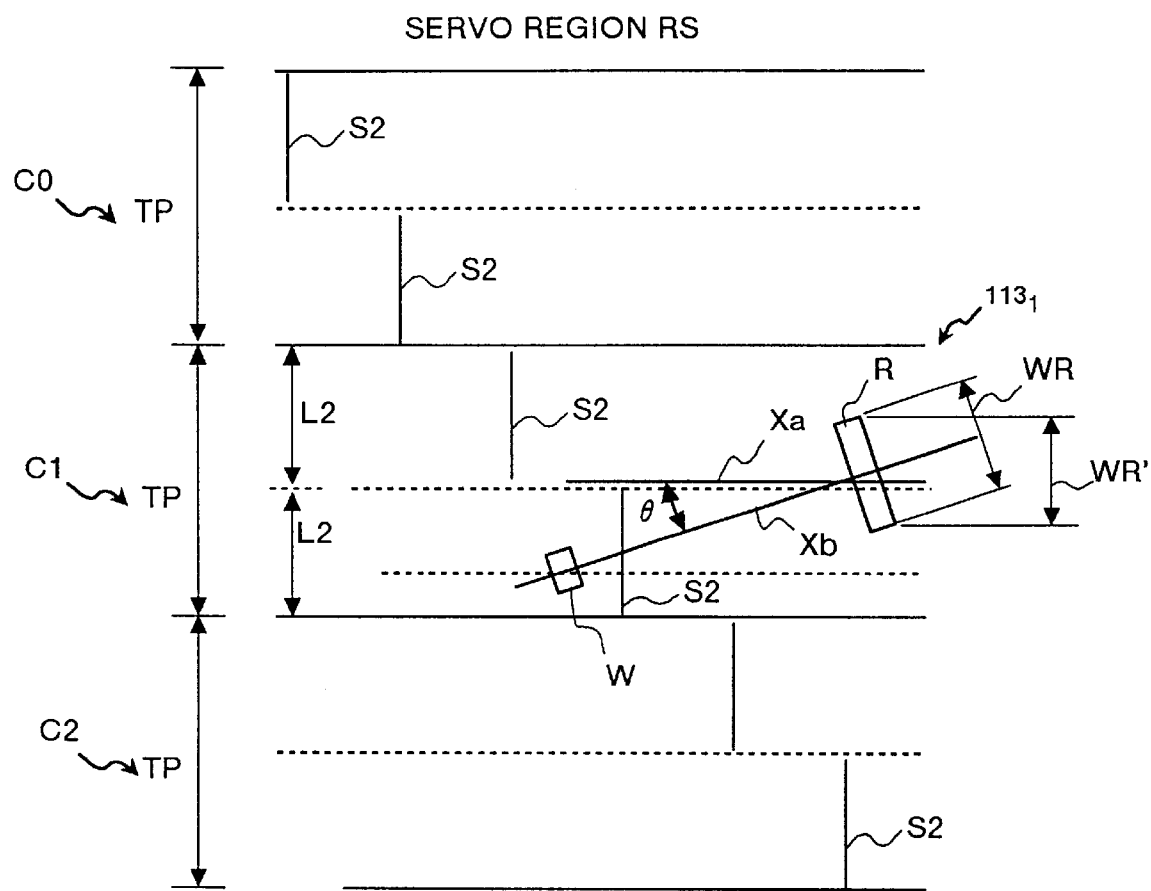
FIG. 12 is a view for explaining a write operation on a magnetic disk.

When the VCM operation rate signal Sm1 is inputted into the VCM driving circuit 127 shown in FIG. 2, the VCM driving circuit 127 outputs a drive current according to the VCM operation rate signal Sm1 to the VCM 115 through the connector 140. With this operation, the VCM 115 is driven, and the magnetic head $113_1$ shown in FIG. 11 and FIG. 12 is moved at a ½ track pitch in the radius direction of the disk. Thus, the magnetic head $113_1$ first moves in a direction traversing the cylinder C0. During this movement, the servo patterns S2, S2, . . . are detected by the read core R. Information regarding the result of this detection is inputted into the servo demodulator 129 through the head IC $117_1$, FPC 116, and connector 140.

The servo demodulator 129 detects a position of the magnetic head $113_1$ according to a phase difference between the servo patterns S2 and S2 recorded in the servo region RS (Refer to FIG. 10), and feeds back a result of detection to the comparing section 130 shown in FIG. 3 as a target position signal Sp0.

The operation described above is executed hereinafter, and a positional error signal Ss as a difference between a target position signal Sp0 and a detected position signal Sp1 is outputted to the amplifying section 131 by the comparing section 130. The positional error signal Ss is amplified with the gain G0 by the amplifying section 131, and an amplified positional error signal P0 is outputted to the control section 132. With this operation, the control section 132 obtains an operation rate for the VCM 115 so that the amplified positional error signal P0 becomes zero, and outputs a VCM operation rate signal Sm1 according to this operation rate to the VCM 115 (VCM driving circuit 127 in FIG. 2).

Assuming herein that the read core R of the magnetic head 1131 shown in FIG. 11 is positioned at the center (track center) of the cylinder C1 as a target position, the write core W provided in the other edge thereof positions at the center (track center) of the cylinder C1 in the data region RD. Namely, the write core W is positioned on the track. In this track-on state, the read/write circuit 126 feeds a recording current according to the write data to the write core W of the magnetic head $113_1$ under the control by the control circuit 125. With this operation, the write data is written in the cylinder C1 (track) on the data region RD by the write core W.

Figure 14:
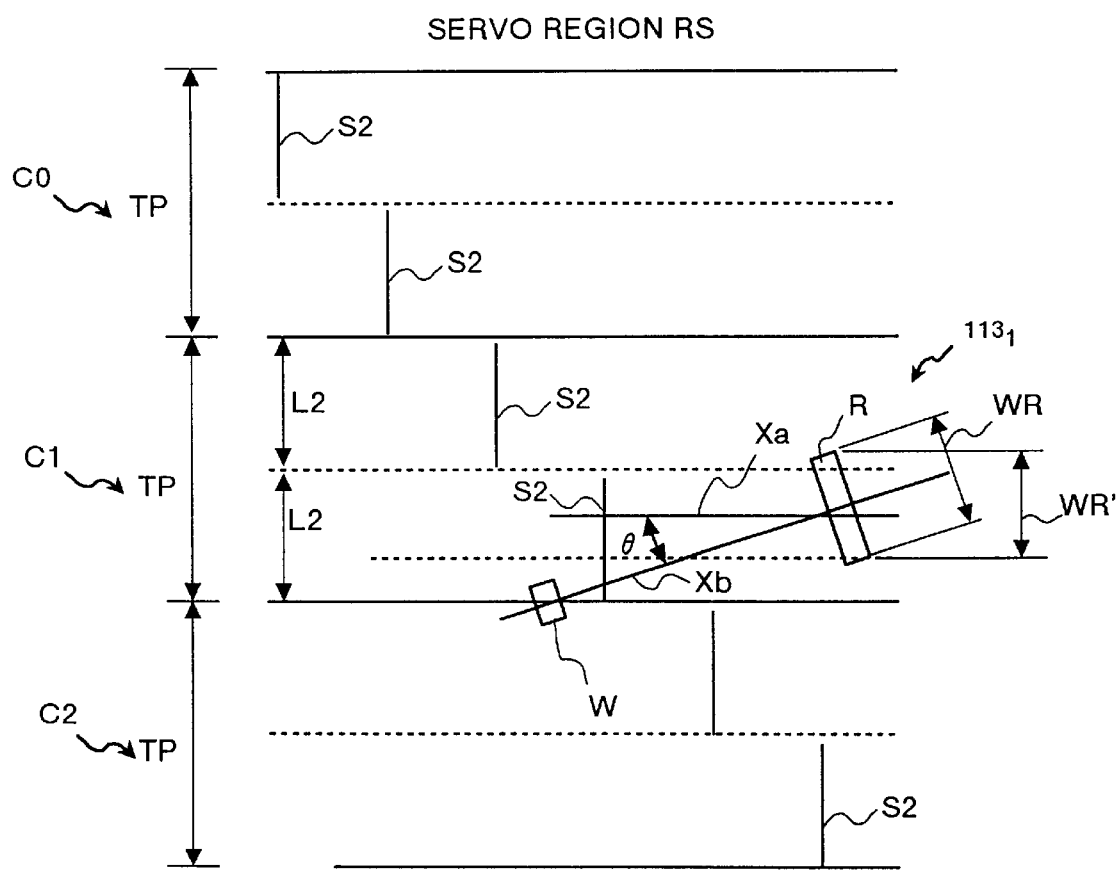
FIG. 14 is a view for explaining a read operation on a magnetic disk.
Figure 15:
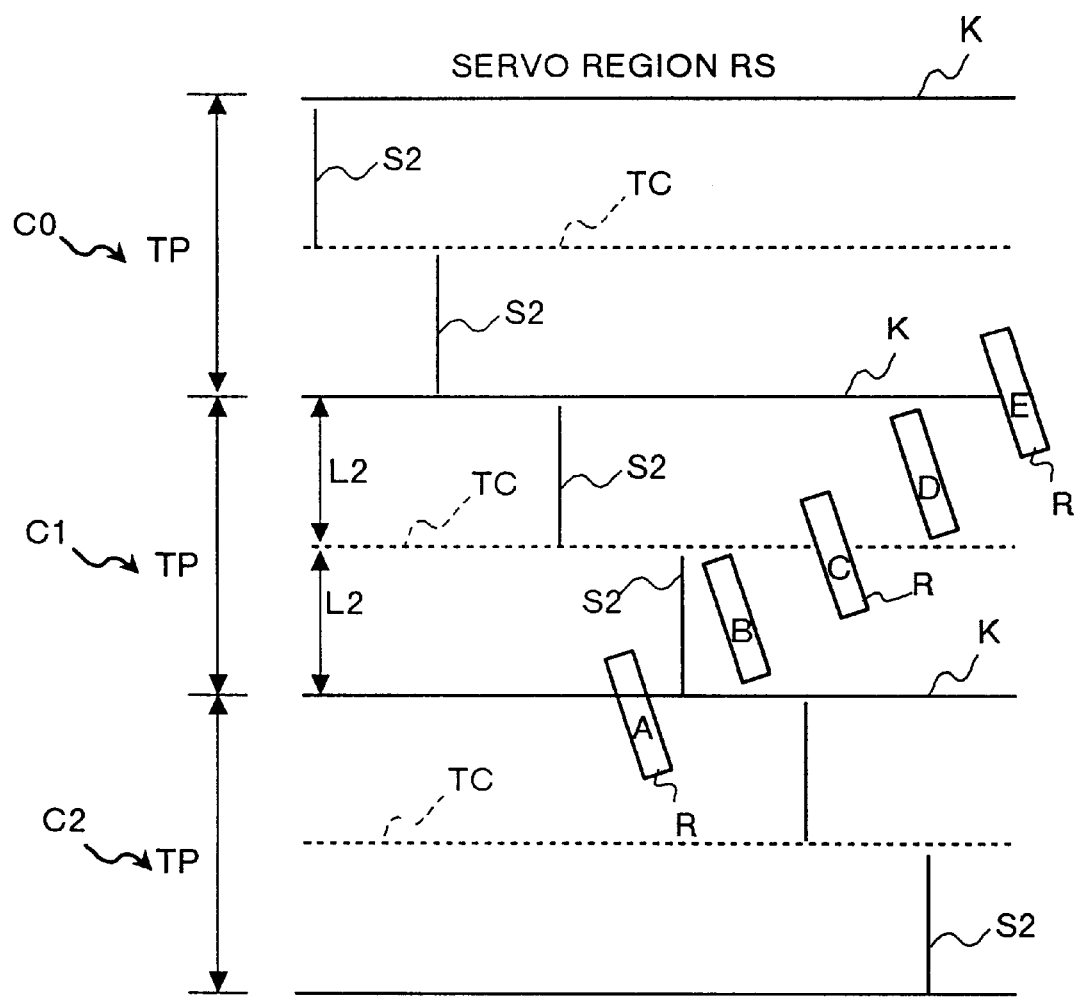
FIG. 15 is a view showing each position of movement of a read core.
Figure 16:
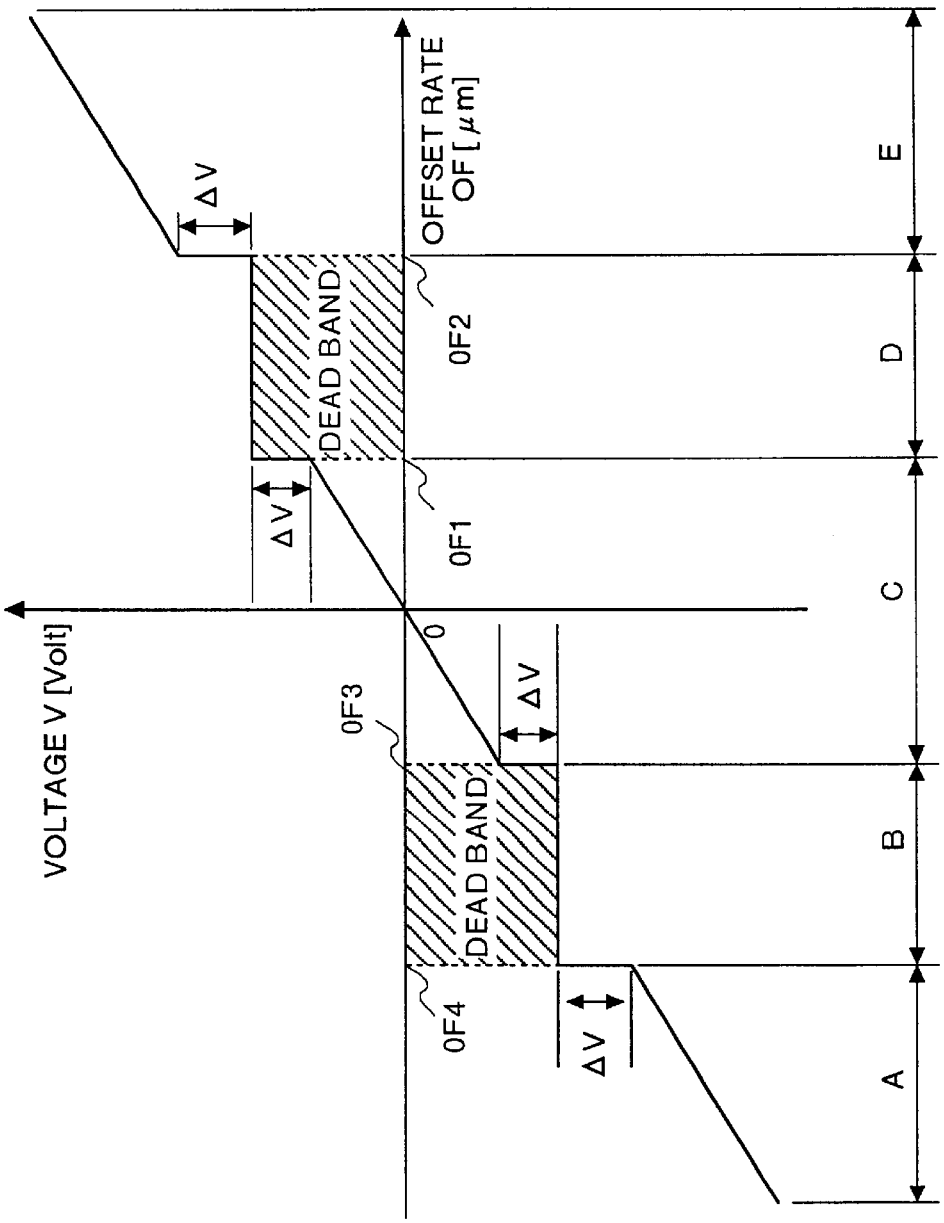
FIG. 16 is a view for explaining the problems in the conventional type of storage device.

Next description is made for the operation of reading with reference to FIG. 11, FIG. 14 and FIG. 15. The description of this reading operation assumes a case where the data written in the cylinder C1 (track) on the data region RD shown in FIG. 11 is read out.

At the time of data reading as described above, the HDC circuit 121 shown in FIG. 2 sets a gain of the amplifying section 131 shown in FIG. 3 to the gain G1 (or the gain G2) for reading. With this operation, the gain of the amplifying section 131 is the gain G1 (or the gain G2) which is lower as compared to the gain G0 at the time of data writing.

In the state of the gain set as described above, it is assumed that the write core W of the magnetic head $113_1$ is positioned on the track as shown in FIG. 11. Namely, in the example shown in FIG. 11, as the read core R is not positioned at the center (track center) of the cylinder C1 on the data region RD, the read core R has to be moved to the side of the cylinder C2 equivalent to a correction rate H for displacement of the core in order to read data.

It is assumed herein that the read core R lies over the track center TC of the cylinder C1 (track) as shown in FIG. 15, in other words, that the read core is located at the position C laying astride the servo pattern S2 and servo pattern S2. When the read core R is located at this position C, a phase difference between the servo pattern S2 and servo pattern S2 can be detected, so that a voltage V of the amplified positional error signal P1 (or the amplified positional error signal P2) shown in FIG. 3 linearly changes according to the offset rate OF in a range (offset rate OF1 to offset rate OF3) of the position C shown in FIG. 4. Accordingly, when the read core R is located adjacent to the position C, the control section 132 shown in FIG. 3 can accurately check the positional error from the amplified positional error signal P1 (or the amplified positional error signal P2)

Figure 13:
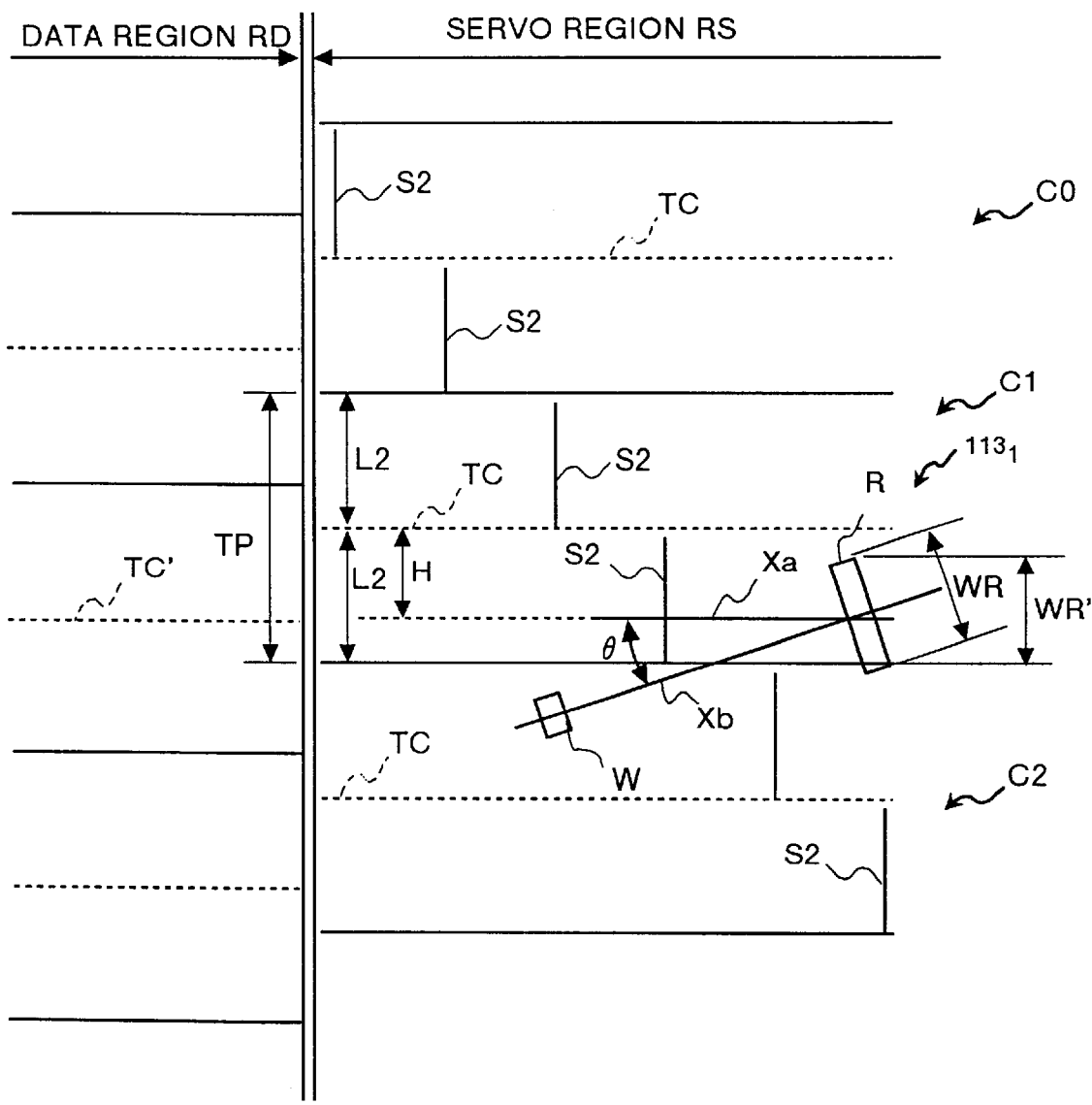
FIG. 13 is a view for explaining a read operation on a magnetic disk.

Assuming herein that the read core R shown in FIG. 11 is moved to the position shown in FIG. 13 by the correction rate H for displacement of the core, the HDC circuit 121 decides the position of the read core R shown in FIG. 13 as a target position and outputs a target position signal Sp0 to the comparing section 130 of the control circuit 125 shown in FIG. 3. With this operation, the comparing section 130 outputs a difference between the detected position signal Sp1 and the target position signal Sp0 as a positional error signal Ss. In this case, it is assumed that the read core R is located at the position C shown in FIG. 15.

The positional error signal Ss is amplified with the gain G1 (or the gain G2) by the amplifying section 131, and the amplified signal is inputted into the control section 132 as an amplified positional error signal P1 (or an amplified positional error signal P2). With this operation, the control section 132 obtains an operation rate for the VCM 115 corresponding to the amplified positional error signal P1 (or the amplified positional error signal P2: Refer to FIG. 3), and outputs a VCM operation rate signal Sm1 according to this operation rate to the VCM 115 (VCM driving circuit 127 in FIG. 2).

When the VCM operation rate signal Sm1 is inputted into the VCM driving circuit 127 shown in FIG. 2, the VCM driving circuit 127 outputs a drive current according to the VCM operation rate signal Sm1 to the VCM 115 through the connector 140. With this operation, the VCM 115 is driven, and the read. core R shown in FIG. 15 is moved from the position C to the position B.

When the read core R is located at the position B shown in FIG. 15, namely in a range from the offset rate OF3 to the offset rate OF4, the read core R is positioned at the dead band. Accordingly, as the read core R can detect only one servo pattern S2, the amplified positional error signal P1 (or the amplified positional error signal P2) is displaced at the offset rate OF3, and is set to a constant voltage V in the range from the offset rate OF3 to the offset rate OF4. However, the gain of the amplifying section 131 is set to the gain G1 (or the gain G2) which is lower as compared to the gain G0 at the time of data writing, so that a voltage displacement rate ΔV' (or a voltage displacement rate ΔV") of the voltage V at the offset rate OF3 is smaller as compared to a voltage displacement rate ΔV of the amplified positional error signal P0 at the conventional offset rate OF3.

Accordingly, even when the read core R is positioned at the dead band, the voltage displacement rate ΔV' (or the voltage displacement rate ΔV") at the voltage V of the amplified positional error signal P1 (or the amplified positional error signal P2) is suppressed to a lower level, which does not allow the level of the VCM operation rate signal Sm1 as an operation rate in the control section 132 to steeply increase which would have occurred conventionally.

When the read core R is moved to the position shown in FIG. 13, the read core R is located at the track center TC' of the cylinder C1 on the data region RD, so that the write data written in the cylinder C1 (track) is detected by the read core R. With this feature, the write data is read by the read/write circuit 126 through the head IC $117_1$, FPC 116, and connector 140 shown in FIG. 2.

It should be noted that FIG. 15 shows the example of the read core R being located at the positions A, D and E respectively, and an amplified positional error signal P1 (or an amplified positional error signal P2) at each of the positions has the characteristic as shown in FIG. 4.

Namely, in the region of the position A (from the offset rate OF4) shown in FIG. 4, the voltage displacement rate ΔV' (or the voltage displacement rate ΔV") of the amplified positional error signal P1 (or the amplified positional error signal P2) has a value which is smaller as compared to the voltage displacement rate ΔV of the amplified positional error signal P0. Also in the region (offset rate OF1~offset rate OF2) of the position D, there exists a dead band, but the voltage displacement rate ΔV' (or the voltage displacement rate ΔV") of the amplified positional error signal P1 (or the amplified positional error signal P2) has a value which is smaller as compared to the voltage displacement rate ΔV of the amplified positional error signal P0. Further, in the region of the position E (after the offset rate OF2), similarly to the above cases, the voltage displacement rate ΔV' (or the voltage displacement rate ΔV") thereof has a value which is smaller as compared to the voltage displacement rate ΔV thereof.

As described above, with the storage device 10 according to the embodiment, the gain G1 (or the gain G2) at the time of data reading in the amplifying section 131 shown in FIG. 3 is set so as to be lower as compared to the gain G0 at the time of data writing. Therefore, it is possible to prevent an operation rate (a VCM operation rate signal Sm1) from its steeply increase even when there exists a dead band.

Consequently, with the storage device 10 according to the embodiment, it is possible to resolve inconvenience based on the conventional technology such that the magnetic heads $113_1$ to $113_n$ vibrate or run away due to steep increase in the operation rate when the magnetic heads $113_1$ to $113_n$ are located in the dead bands.

From the description above, with the storage device 10 according to the embodiment, the servo patterns S2 and S2 obtained by dividing a track TK into two lines can be employed without generation of the inconvenience, which allows a time for STW in the manufacturing field to be reduced, and for this so that the facilities required for manufacturing can also be reduced.

Although the storage device 10 has been described with respect to a specific embodiment of the present invention for a complete and clear disclosure, the appended claims are not to be thus limited but are to be construed as embodying all modifications and alternative constructions that may occur to one skilled in the art which fairly fall within the basic teaching herein set forth. For instance, the storage device 10 according to the specific embodiment has been described with respect to the example of the servo patterns S2 and S2 obtained by dividing a track TK into two lines being employed, but the present invention is not limited to the example described above, and it is also applicable to a case where a line of servo pattern for each track TK is employed.

As described above, in the storage device of the present invention, during movement of a head, even when the level of a detected position signal steeply rises because the head is located at a dead band where a position detecting unit can not accurately detect a position of the head, as the gain of the amplifier is set to a lower value, the amplified positional error signal is not directly affected by the steep rise of the level thereof.

Accordingly, with the storage device of the present invention, even when the head is positioned at a dead band the operation rate does not increase, so that vibrations of the head can be prevented and also a number of lines of servo pattern for each track can be reduced, which allows a time for STW in the manufacturing field to be reduced and facilities also to be reduced.

In the storage device of the present invention, two lines of servo patterns each having a servo pattern length of a ½ track pitch for each track are formed on a disk in time division mode, so that the time for STW can be reduced by ⅔ as compared to that in the case where a number of lines of conventional servo pattern is three lines.

In the storage device of the present invention, gain of the amplifier at the time of data reading is set to ½ of the gain at the time of data writing by a gain setting unit, so that vibrations generated when the head is positioned at a dead band can be reduced to half as compared to those of the conventional type.

In the method of detecting a position of a head on a disk used for the storage device of the present invention, even when the level of a detected position signal steeply rises because the head is located at a dead band where a position of the head can not accurately be detected in the position detecting step, as the gain in the amplifying step is set to a lower value during the movement of the head the amplified positional error signal is not directly affected by the steep rise of the level thereof.

Accordingly, with the invention described above, even when the head is positioned at a dead band, an operation rate does not increase, so that vibrations of the head can be prevented and also a number of lines of servo pattern for each track can be reduced, which allows reduction in a time for STW in the manufacturing field, so that facilities can also be reduced by this reduction rate.

Further, in the method of detecting a position of a head on a disk used for the storage device of the present invention, in a gain setting step, a gain in the amplifying step at the time of data reading is set to ½ of the gain at the time of data writing, so that vibrations generated when the head is positioned at a dead band can be reduced to half as compared to those of the conventional type.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A storage device comprising:
    a disk having a servo region and a data region formed based on time division, the servo region including a plurality of tracks formed at a specified track pitch, each track including servo patterns in number m, where m is a natural number, each servo pattern having a servo pattern length of 1/m track pitch and the data region storing therein data;
    a position detecting unit for detecting a position of a head on the disk according to the servo patterns and outputting a result of detection as a detected position signal;
    a positional error computing unit for obtaining a positional error between the position detected signal fedback by said position detecting unit and a positional error signal indicating a target position of the head and outputting a result of computation as a positional error signal;
    an amplifier for amplifying the positional error signal with a prespecified gain and outputting a result of amplification as an amplified positional error signal;

a gain setting unit for setting a gain in said amplifier at the time of data reading to a lower value as compared to a gain at the time of data writing; and a head moving unit for obtaining an operation rate corresponding to a movement rate of said head according to the amplified positional error signal and moving said head according to the obtained operation rate.

2. The storage device according to claim 1, wherein m is equal to two.

3. The storage device according to claim 1, wherein said gain setting unit sets a gain in said amplifier at the time of data reading to a value which is ½ of the gain at the time of data writing.

4. The storage device according to claim 2, wherein said gain setting unit sets a gain in said amplifier at the time of data reading to a value which is ½ of the gain at the time of data writing.

5. A method of detecting a position of a head on a disk used for a storage device comprising a disk having a servo region and a data region formed based on time division, the servo region including a plurality of tracks formed at a specified track pitch, each track including servo patterns in number m, wherein m is a natural number, each servo pattern having a servo pattern length of 1/m track pitch, and a data region for storing therein data; said method comprising:

a position detecting step of detecting a position of a head on the disk according to the servo patterns and outputting a result of detection as a detected position signal;

a positional error computing step of obtaining a positional error between the position detected signal fed-back in the position detecting step and a positional error signal indicating a target position for the head and outputting a result of computation as a positional error signal;

an amplifying step of amplifying the positional error signal with a prespecified gain and outputting a result of amplification as an amplified positional error signal;

a gain setting step of setting a gain in the amplifying step at the time of data reading to a lower value as compared to a gain at the time of data writing; and a head moving step of obtaining an operation rate corresponding to a movement rate of the head according to the amplified positional error signal and moving the head according to the obtained operation rate.

6. The method according to claim 5, wherein m is equal to two.

7. The method according to claim 5, wherein in the gain setting step, a gain in the amplifying step at the time of data reading is set to a value which is ½ of the gain at the time of data writing.

8. The method according to claim 6, wherein in the gain setting step, a gain in the amplifying step at the time of data reading is set to a value which is ½ of the gain at the time of data writing.

* * * * *